United States Patent Office 3,093,732
Patented June 11, 1963

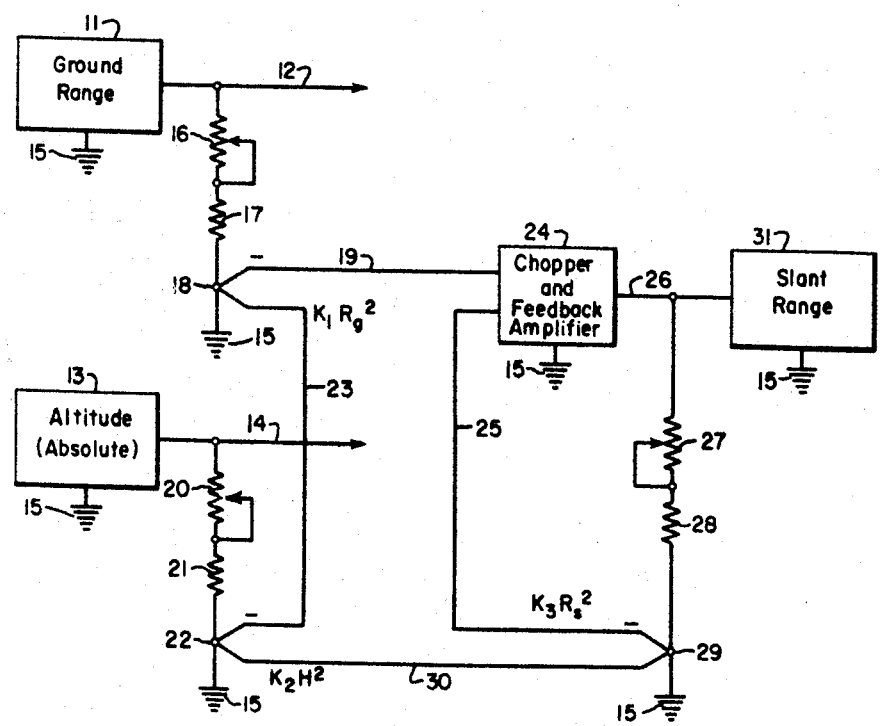

3,093,732
VECTOR RESOLVER COMPUTER APPARATUS
James O. Clark, Baltimore, Md., assignor to Westinghouse Electric Corporation, East Pittsburgh, Pa., a corporation of Pennsylvania
Filed May 6, 1957, Ser. No. 657,388
1 Claim. (Cl. 235—189)

This invention relates to improvements in electrical computer apparatus, and more particularly to computer apparatus having means for utilizing for computation purposes electrical signals of different frequencies.

The apparatus of the instant invention is particularly suitable for obtaining a signal or voltage corresponding to the magnitude of a resultant vector from signals corresponding to quadrature vector components, such for example, as a signal corresponding to the magnitude of a resultant vector representing the slant range to a target where there are available voltages or signals representing vector distances corresponding to ground range and altitude.

Prior art computer apparatus for accomplishing vector addition may employ a precision resolver in conjunction with a servo motor, a servo amplifier, an automatic gain control circuit, and two resolver input amplifiers, to generate a signal representing the magnitude of a resultant vector. In such apparatus, it is usually necessary that the signals representing the various vector quantities to be added must be of the same frequency, and usually also the signal output representing the computed resultant vector must be of the same frequency as the other signals.

The apparatus of the instant invention provides a simple and efficient means for solving for the amplitude of a voltage or signal corresponding to the magnitude of the resultant vector by addition of two or more analog voltages representing space vectors in quadrature. The voltages representing the quadrature vectors may be of different frequencies, and the output voltage representing the resultant vector can be of any desired frequency from zero or direct current to a frequency in the radio-frequency range.

In accomplishing this objective, the apparatus of the instant invention employs three thermocouples, and three dropping resistors with associated trimming potentiometers connected in series with the thermocouples, in conjunction with a high gain feedback and chopper amplifier. The thermocouples generate voltages which are proportional to the squares of the effective values of the currents passing through their heaters and are therefore substantially independent of frequency. An adjustment of scaling factors may be made to compensate for the fact that the thermocouple outputs are functions of the effective values of the signal currents.

Accordingly, it is a primary object of the instant invention to provide new and improved computer apparatus.

Another object is to provide new and improved computer apparatus in which signals of different frequencies may be added in a single circuit to provide a signal output of any preselected frequency not related to either of the signal frequencies.

Another object is to provide new and improved computer apparatus employing thermocouples.

A further object is to provide new and improved computer apparatus particularly suitable for solving vector equations.

Other additional objects will become apparent after a perusal of the following specification when studied in connection with the accompanying drawing in which the single FIGURE thereof shows a circuit diagram partially schematic and partially in block form, of apparatus according to the preferred embodiment of the invention.

The apparatus shown in block form and designated 11 is any convenient means for obtaining a signal having an amplitude proportional to a quadrature vector component. By way of illustration, the signal obtaining means 11 is shown as providing on lead 12 a signal proportional to ground range and the signal obtaining means 13 is for purposes of illustration considered as providing a signal having an amplitude proportional to the altitude of an aircraft or target and applying said signal to lead 14, the altitude being a vector which lies in quadrature with ground range, these being combined or added to provide a resultant vector proportional in amplitude to the slant range to the target, in a manner well known to those skilled in the art. The signals on the aforementioned leads 12 and 14 are with reference to ground 15. Leads 12 and 14 may conduct their respective signals to other points, not shown, in other computer apparatus. Connected between lead 12 and ground 15 is a rheostat or potentiometer 16, a resistor 17 and a thermocouple 18, all connected in series, the polarity of the thermocouple being selected so that the negative polarity of the generated voltage is applied to lead 19. Thermocouple 18, as are all the other thermocouples hereinafter to be mentioned, is an insulated thermocouple; that is, there is no electrical connection between the output leads across which a voltage is developed and ground 15. In like manner, there are connected in series between lead 14 and ground 15 a potentiometer or rheostat 20, fixed resistor 21, and thermocouple 22, the thermocouple 22 being constructed and arranged so that the direct current voltage generated thereby applies a negative polarity to lead 23, the voltage outputs of thermocouples 18 and 22 being added and applied to aforementioned lead 19 which is connected to the input of a feedback amplifier and chopper device shown in block form at 24.

The apparatus designated 24 may be of any convenient design, and may consist of a high-gain, good performance direct current amplifier, or, dependent upon the frequency desired at lead 26 it may contain as parts thereof a chopper device, not shown, having a chopper frequency selected in accordance with the desired frequency output of apparatus 24, the chopper interrupting the direct current signals on both input leads 19 and 25, lead 25 being provided for purposes to be made hereinafter more clearly apparent. The chopped signals may be added and/or both applied to a tuned transformer, not shown, having a step-up ratio of, for example, 50 to 1, and the output of the transformer applied to a high gain alternating current feedback amplifier, not shown, the output of the amplifier being developed between lead 26 and ground 15.

The apparatus shown in block form at 24 is constructed and arranged to provide on output lead 26 a signal of the preselected frequency having an amplitude approximately proportional to the square root of the sum of the squares of the input signals, as will hereinafter become more clearly apparent. Connected between lead 26 and ground 15, in series, are a potentiometer or rheostat 27, fixed resistor 28, and thermocouple 29, thermocouple 29 being constructed and arranged to provide a direct current potential with a negative polarity on the aforementioned lead 25 and a positive polarity on lead 30 which is connected to the aforementioned thermocouple 22.

The aforementioned voltage on lead 26 representing by its amplitude the magnitude of the resultant vector corresponding to slant range is conducted to means for utilizing the signal, shown in block form and designated 31.

The apparatus of the instant invention is designed to solve the equation $$K_1 R_g^2 + K_2 H^2 - K_3 R_s^2 = \Sigma$$

where $\Sigma$ is made to approach zero by the high gain amplifier; or $$R_s = \sqrt{R_g^2 + H^2 - \Sigma}$$

The voltage output of thermocouple 29 provides, in effect the feedback voltage to the aforementioned high gain amplifier included in 24, which feedback is needed for the solution of the above equation, in accordance with well known computer principles set forth, for example, in Electronic Instruments, vol. 21, ch. 6, Radiation Laboratory Series, McGraw-Hill Book Co., Inc., 1948, and elsewhere. The square terms are conveniently obtained by the thermocouples, the voltage outputs of which are proportional to the square of the effective currents flowing through the heaters of the thermocouples. Scaling may be accomplished by suitable choice of values for the aforementioned resistors 17, 21 and 28, and trimming balances may be obtained by adjustment of the aforementioned potentiometers or rheostats 16, 20 and 27. The factors $K_1$, $K_2$ and $K_3$ may for the purposes of the calculation, be made substantially equal, suitable scaling being made, so that the output voltage $R_s$ on the aforementioned lead 26 is approximately equal to $$\sqrt{R_g^2 + H^2}$$

the $K_1$, $K_2$ and $K_3$ constants being eliminated from the equation.

Whereas in the above equation, voltages corresponding to $R_g$, $H$ and $R_s$ have been used for illustration, it will be understood that the apparatus is suitable for solving any equation of the general form $$E_3 = \sqrt{E_1^2 + E_2^2 - \Sigma}$$

The output of the apparatus shown in block form at 24 is a voltage of just sufficient amplitude to cause the voltage generated by the thermocouple 29 to substantially balance the sum of the voltages generated by the thermocouples 18 and 22 so that the resulting input to the amplifier approaches zero. As will be readily understood by those skilled in the art, any change in either of the voltages from thermocouples 18 and 22 resulting from changes in the signals from sources 11 and 13 respectively will result in an unbalance of voltages at the input of the amplifier of apparatus 24, and the voltage on output lead 26 will be accordingly adjusted to a new value sufficient to generate a substantially equal or balancing voltage in the aforementioned thermocouple 29.

If desired, additional feedback for stabilizing purposes may be provided by means, not shown, connected to the amplifier of apparatus 24.

In the apparatus illustrating the invention, it will be noted that the voltage on lead 26 representing $R_s$ never goes to zero. Should it be desired to employ the instant invention to compute a signal which goes to zero, a phase detector of conventional design, not shown, may be added to maintain circuit stability, as will be readily understood by those skilled in the art.

Whereas the apparatus has been shown and described with reference to a preferred embodiment thereof which gives satisfactory results, alterations may be made and equivalents substituted without departing from the spirit and scope of the invention.

I claim as my invention:

Computer apparatus comprising a pair of input analogue circuits which are adapted to have impressed thereon input analogue signals representing respective quadrature vector quantities, first and second thermocouples thermally disassociated from each other and energized, respectively, by said pair of input circuits for independently generating direct current voltages which are respective linear functions of the squares of the current in the respective input circuits, amplifier means having an input circuit and an output circuit, a third thermocouple operatively associated with the output circuit of said amplifier and thermally disassociated from said first and second thermocouples and responsive to the signal in the output circuit of said amplifier to generate a direct current feedback voltage proportional in amplitude to the square of the amplitude of the output of said amplifier, said first and second thermocouples being connected in a series circuit including the input circuit of said amplifier and said third thermocouple, said first and second thermocouples being poled so that their voltages add in opposition to the voltage generated by said third thermocouple, whereby for the null condition of said input circuit of said amplifier the voltage in said output circuit of said amplifier will be substantially equal to the square root of the sum of the squares of the voltages generated by said first and second thermocouples.

References Cited in the file of this patent

UNITED STATES PATENTS

| | | |
|---|---|---|
| 2,496,674 | Omberg | Feb. 7, 1950 |
| 2,496,860 | Davis | Feb. 7, 1950 |
| 2,593,950 | Williams | Apr. 22, 1952 |
| 2,605,962 | Berger | Aug. 5, 1952 |
| 2,857,569 | Gilbert et al | Oct. 21, 1958 |
| 2,917,237 | Davidson | Dec. 15. 1959 |

OTHER REFERENCES

Product Engineering (Wall), September 1953, pps. 138 and 139.